Nov. 5, 1957  H. J. ROOSDORP  2,812,481
SELF-BALANCING SERVOMOTOR CIRCUIT
Filed Jan. 3, 1955
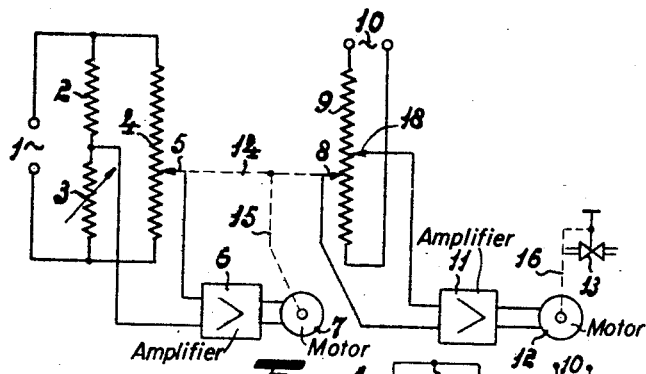
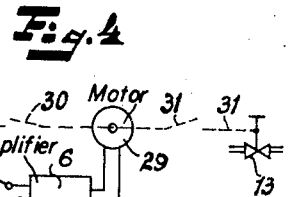
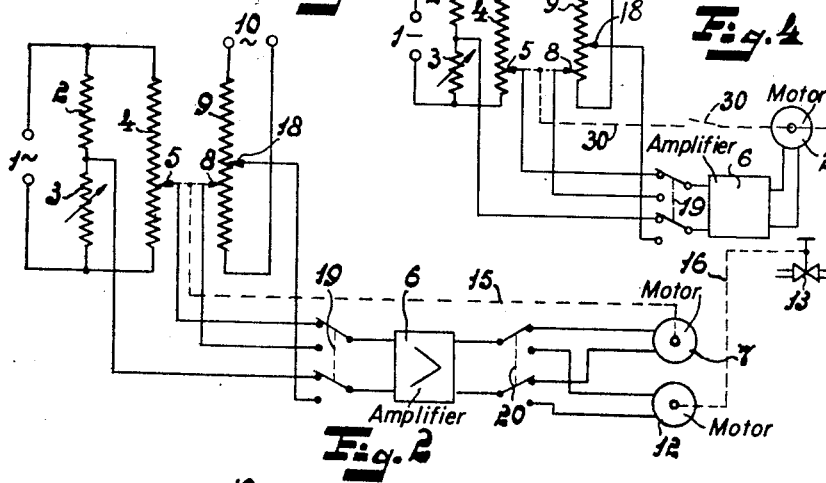
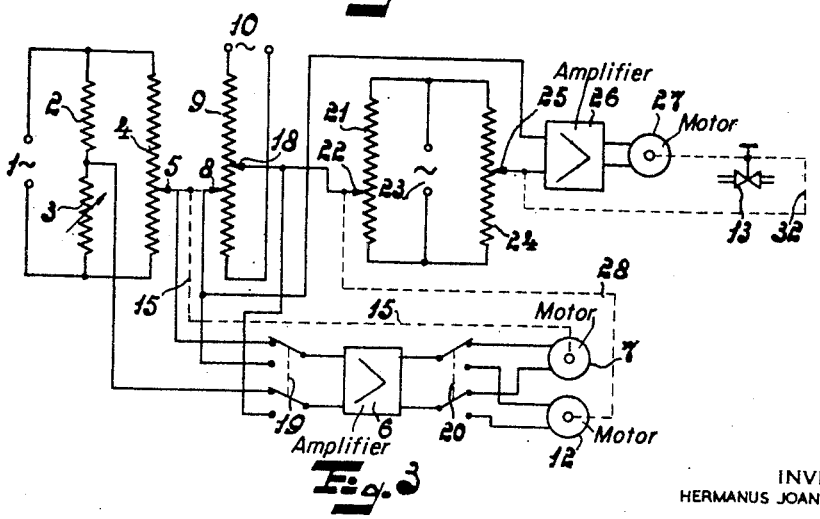
INVENTOR
HERMANUS JOANNES ROOSDORP
BY *Fred M. Vogel*
AGENT United States Patent Office 2,812,481
Patented Nov. 5, 1957

2,812,481

SELF-BALANCING SERVOMOTOR CIRCUIT

Hermanus Joannes Roosdorp, Emmasingel, Eindhoven, Netherlands, assignor, by mesne assignments, to North American Philips Company, Inc., New York, N. Y., a corporation of Delaware Application January 3, 1955, Serial No. 479,605

Claims priority, application Netherlands January 4, 1954

6 Claims. (Cl. 318—19)

The present invention concerns measuring circuit arrangements. More particularly, the invention concerns measuring circuit arrangements of the self-compensating type.

For measuring physical magnitudes, for example pressures, temperatures, electric voltages and the like, it is known to use a self-compensating measuring arrangement. In such an arrangement a voltage obtained from the magnitude to be measured is brought into equilibrium with a known variable voltage. Use is often made of a plurality of impedances, more particularly resistors, united to form a Wheatstone bridge, of which impedances one or more are affected by the magnitude to be measured. The bridge is fed from a voltage supply having a constant voltage, which is supplied to one of the diagonals. At the other diagonal occurs a voltage which varies with the magnitude to be measured. This voltage is applied to an amplifier, the output circuit of which controls an electrically energized adjusting member, by means of which the said voltage is compensated. This may be accomplished by the connection of two series-connected bridge branches to the voltage supply to constitute a potentiometer, along which a sliding contact is movable, and by the deriving of the voltage fed to the amplifier from said contact. The sliding contact is driven by the adjusting member and its position on the potentiometer is an indication of the magnitude to be measured. As an alternative, the bridge voltage may be compensated by means of a second bridge circuit connected to the same voltage supply, and by deriving a variable voltage from said bridge by means of the adjusting member. In this case also, the position of the adjusting member indicates the value of the magnitude to be measured.

These are so-called indicating zero methods for measuring, which are particularly advantageous, if the magnitude measured is to be recorded simultaneously, since a supply of practically unlimited power is available for driving the recording member. The adjusting member may be a motor or may be driven by a motor which stops as soon as the total voltage in the compensation circuit is equal to zero.

It is also known to provide such bridge circuits with a device which permits the control of the measured or recorded magnitude. This control-device is governed by a voltage which is substantially proportional to the difference between the real value of the magnitude to be measured at a given instant and the desired value of said magnitude.

The invention will be described more fully with reference to the drawing, wherein:

Fig. 1 is a schematic diagram of a known measuring circuit arrangement;

Fig. 2 is a schematic diagram of an embodiment of a measuring circuit arrangement of the present invention;

Fig. 3 is a schematic diagram of a modification of the measuring circuit arrangement of Fig. 2; and Fig. 4 is a schematic diagram of a modification of a portion of the measuring circuit arrangements of Figs. 2 and 3.

Referring to Fig. 1, reference numeral 1 designates an alternating voltage supply of constant voltage, which feeds a bridge circuit comprising the series-connected resistors 2 and 3 and a potentiometer resistor 4 connected in parallel with this series combination. The resistor 3 is variable, since it is subjected to the variable magnitude to be measured and controlled.

If the magnitude to be measured is the temperature of a space to be held constant, the resistor 3 may comprise a resistance thermometer, positioned in or near the space. The resistor 3 may have a comparatively high temperature coefficient. Use may, as an alternative, be made of a thermo-element, the electromotive force of which is compared in the circuit with a constant voltage. The bridge circuit is not essential for the invention; use may be made of a circuit, which includes two impedances connected in series, across one of which the voltage to be measured is operative and across the other of which the known compensation voltage is operative. The latter voltage is adjusted in such a manner that the total voltage across the circuit is equal to zero.

If a mechanical tension is to be measured, one or both of the resistors 2 and 3 may be constructed in the form of so-called expansion strips or extensometers, which are secured to the structural part in which the tension is to be measured. The resistance value of said strips varies with the tension in the resistance material.

The bridge diagonal between the common point of the resistors 2 and 3 and a sliding contact 5 of the potentiometer 4 constitutes the input circuit of an amplifier 6, comprising one or more discharge tubes, the output circuit of which is connected to a phase sensitive motor 7. During its operation, the motor 7 moves the sliding contact 5 in a sense such that the bridge equilibrium, which is disturbed by the variation in the resistor 3, is restored. As soon as equilibrium is restored, the motor stops. The mechanical coupling between the motor and the sliding contact 5 is shown in Fig. 1 by the broken lines 14 and 15.

An indicating dial or scale may be provided with the potentiometer 4. The position of the contact 5 is an indication of the magnitude to be measured.

To maintain the measured magnitude at a given value, the sliding contact 5 is coupled mechanically with a sliding contact 8 of a second potentiometer 9 in such a manner that the sliding contacts 5 and 8 invariably occupy the same positions relative to their associated potentiometers 4 and 9. The potentiometer 9 is connected to an alternating voltage source 10, having the same frequency and phase as the supply source 1.

The potentiometer 9 is provided with a contact 18, which occupies a fixed position during the operation; said position depending upon the desired value of the measured magnitude. By a suitable adjustment, the voltage between the contacts 8 and 18 may be made to indicate the difference between the desired value and the real or actual value of the magnitude to be measured and controlled or regulated. The difference voltage is supplied to the input circuit of a second amplifier 11, the output current of which governs a control-device. This may, for example, be carried out by means of a phase-sensitive motor 12, driven by the output current of the amplifier 11 and acting upon a control-valve 13 by way of a mechanical transmission 16. The motor 12 may be replaced by a relay device; instead of using a control-valve a different member may be used, for example a variable resistor, which governs the energy supply to a heating element in the space required to have a constant temperature. The adjustment is such that at an excessively low temperature in the space, the heater energy supply is increased, and at an excessively high space temperature, said supply is decreased. At the desired temperature, the contacts 8 and 18 occupy the same positions on the potentiometer 9 resistor, so that no input voltage is operative at the difference of the amplifier 11, and the motor 12 is inoperative.

The present invention is based on the recognition of the fact that it is not required that the voltages derived from the potentiometers 4 and 9 be constantly operative across the input circuits of the amplifiers 6 and 11, in order to obtain satisfactory measurement and control operations. This is particularly true if the conditions acting upon the magnitude to be measured and controlled vary only slowly, in which case use is preferably made of a so-called integral control; it is sufficient for the voltage between the contacts 8 and 18 to periodically control the regulating means or control device 13 for only short instants. This recognition is utilized in the present invention to materially simplify the control-device circuit arrangement.

The invention relates to a self-compensating measuring arrangement, in which the voltage occurring across a compensation circuit is supplied to an amplifier, the output voltages of which govern the member serving to compensate the circuit; a device being provided for controlling or regulating the measured magnitude, said device being governed by a voltage which is substantially proportional to the difference between the real value and the desired value of said magnitude. The invention comprises a changeover device, by means of which the voltage across the compensating circuit and the difference voltage are alternately fed to the input circuit of the amplifier and the compensating means and the control-device are actuated at the same time their respective input voltages are fed to said amplifier.

With a so-called integral control, the arrangement is preferably such that the period for which the compensation means is operative is large with respect to the period for which the control-device is operative.

The arrangement according to the present invention has the advantage that only a single amplifier which alternately performs the function of a measuring amplifier and of a control-amplifier, is required. Use may be made, for example, of two driving members, for example motors, one of which serves for the compensation function and the other of which serves for the control function. A further economy is obtained, if the two functions are performed by a single motor. In such case, however, a mechanical change-over device, by which the motor may alternately control first one variable member and then the other, must be utilized.

The invention is described with reference to the circuit diagram of Fig. 2, in which corresponding elements are designated by the same reference numerals as in Fig. 1.

The arrangement of Fig. 2 is distinguished from that of Fig. 1 in that use is made of only one amplifier 6, and of two intercoupled change-over switches 19 and 20. When the switches 19 and 20 are in the positions of Fig. 2, the voltage across the bridge is fed to the amplifier 6 and the output voltage of said amplifier controls the motor 7. The arrangement is then suitable for magnitude measuring. When the switches 19 and 20 are in their other positions, the voltage obtained from the potentiometer 9 is operative across the input circuit of the amplifier 6 and the output circuit of said amplifier is connected to the motor 12. In this arrangement, the control or regulating function is performed.

The switches 19 and 20 may be controlled mechanically or electrically. The arrangement is such that the magnitude measurement is interrupted each time only for a short instant; for example, for one second per minute. During said second of interruption, an integral control function is performed. The integration may occur in various ways, as, for instance, by means of a motor having a speed which is proportional to the terminal voltage, as is employed, for example, with kilowatthour meters. As an alternative, induction motors having a speed which is made linearly variable with a voltage by negative feed back by way of a tachometer generator coupled with the motor, may be utilized. In the latter case the amplifier output is fed back.

The discontinuity of integral control does not adversely affect the result with most thermal processes, nor does the transient interruption of the measurement function produce adverse results.

Fig. 3 is a more complete circuit diagram of an arrangement of the present invention. The arrangement of Fig. 3 comprises elements corresponding to those of Fig. 2, and circuit elements by means of which a so-called proportional control is performed. The latter elements are constituted by a potentiometer 21, a potentiometer 24 connected in parallel with the potentiometer 21, a source of voltage supply 23, an amplifier 26 and a driving motor 27 for the control-member 13. The voltage supply 23 has the same frequency and phase as the voltage supplies 1 and 10, but it is otherwise independent thereof. A sliding contact 22 of the potentiometer 21 is connected electrically to the adjusting contact 18. The input voltage for the amplifier 26 is obtained between the contact 8 of the potentiometer 9 and a contact 25 of the potentiometer 24. The control-member 13 is coupled mechanically with the contact 25.

If it is first assumed that the contact 22 occupies a fixed position, the motor 7 will start rotating when the switches 19 and 20 are in their positions of Fig. 3, described above, if the equilibrium of the bridge 2, 3, 4 is disturbed due to a variation in the magnitude to be measured and controlled, so that the contact 5 is moved in a manner to restore the bridge equilibrium. Across the input terminals of the amplifier 26 occurs a voltage obtained from the contact 8, the position of which indicates the real value of the magnitude and from the contact 18, which indicates the desired adjustment. If it is furthermore assumed that the bridge circuit connected to the supply voltage 23 and constituted by the potentiometers 21 and 24 is in equilibrium, the voltage between the contacts 22 and 25 is equal to zero. The motor 27 is then actuated by the deviation of the real value from the desired value and controls the control-member 13 in a sense such that the deviation is reduced. When the deviation has become zero, the motor 27 stops. The control-member 13 moves the sliding contact 25 in a manner such that an additional voltage becomes operative across the input circuit of the amplifier 26 this additional voltage counteracting the voltage between the contacts 8 and 18. Consequently, the control-member 13 is displaced only to such an extent that these two voltages are in equilibrium in the input circuit of the amplifier 26; or, in other terms, it is moved through a distance which is proportional to the deviation of the controlled value from the desired value. This constitutes a so-called proportional control.

After a period of time the switches 19 and 20 are switched to their other, or lower positions, so that the difference voltage between the points 8 and 18 is fed to the input circuit of the amplifier 6 and the motor 12 is connected to the output circuit of said amplifier. If the difference voltage is not equal to zero, the motor 12 operates to perform a second control-operation. In this case, the motor 12 is preferably chosen to be such that its speed is proportional to the terminal voltage. The sliding contact 22 of the potentiometer 21 is then displaced in such a manner that an additional voltage is produced across the input circuit of the amplifier 26. It is obvious that in this manner a control function is performed, in which the displacement of the control-member 13 is proportional to the deviation of the magnitude from the desired value, integered in time during a certain period. This is consequently a combined proportional and integral control, in which the integral control takes place during a short period of time.

For the integral control function and the measurement function, use may be made of a single motor. When a single motor is used, however, a mechanical change-over device must be utilized. This is shown in Fig. 4. The motor 29 alternately controls the contacts 5 and 8 by way of a member 30 (shown diagrammatically) and the control member 13 through a member 31. The changeover is performed in the same manner as with the switches 19 and 20.

While the invention has been described by means of specific examples and in specific embodiments, I do not wish to be limited thereto, for obvious modifications will occur to those skilled in the art without departing from the spirit and scope of the invention.

What is claimed is:

1. A circuit arrangement for measuring and regulating a physical quantity comprising means for deriving a first voltage dependent upon the magnitude of said physical quantity, means for producing a second voltage, means for varying the amplitude of said second voltage comprising a first potentiometer having a control member, means for producing a third voltage, means for varying the amplitude of said third voltage comprising a second potentiometer having a control member, means for producing a fourth voltage dependent upon a predetermined magnitude of said physical quantity, means for combining the said variable second voltage with said first voltage thereby to produce a first residual voltage, means for combining the said variable third voltage with said fourth voltage thereby to produce a second residual voltage, an electrically energized adjusting member coupled to the said control members of said first and second potentiometers, electrically energized regulating means for varying the magnitude of said physical quantity, and switching means for applying said first residual voltage to said adjusting member in one operative condition to displace the control member of said first potentiometer to a position at which said first residual voltage is substantially zero and for applying said second residual voltage to said regulating means in another operative condition to vary the magnitude of said physical quantity, the extent of the adjustment of the control member of either of said first and second potentiometers constituting the measurement of said physical quantity and said physical quantity having said predetermined magnitude at a substantially zero value of said second residual voltage.

2. A circuit arrangement as claimed in claim 1, wherein said switching means comprises an amplifier having an input circuit connected to said first and second residual voltage producing means and an output circuit connected to said adjusting member and said regulating means and synchronous switches interposed in said input and output circuits.

3. A circuit arrangement as claimed in claim 2, wherein said synchronous switches in one operative condition connect said first residual voltage producing means with said amplifier and said amplifier with said adjusting member and in another operative condition connect said second residual voltage producing means with said amplifier and said amplifier with said regulating means.

4. A circuit arrangement for measuring and regulating a physical quantity comprising means for deriving a first voltage dependent upon the magnitude of said physical quantity, means for producing a second voltage, means for varying the amplitude of said second voltage comprising a first potentiometer having a control member, means for producing a third voltage, means for varying the amplitude of said third voltage comprising a second potentiometer having a control member, means for producing a fourth voltage dependent upon a predetermined magnitude of said physical quantity, means for combining the said variable second voltage with said first voltage thereby to produce a first residual voltage, means for combining the said variable third voltage with said fourth voltage thereby to produce a second residual voltage, a first electrically energized adjusting member coupled to the said control members of said first and second potentiometers, means for varying the magnitude of said physical quantity, a second electrically energized adjusting member coupled to said magnitude varying means, and switching means for applying said first residual voltage to said first adjusting member in one operative condition to displace the control member of said first potentiometer to a position at which said first residual voltage is substantially zero and for applying said second residual voltage to said second adjusting member in another operative condition to vary said magnitude varying means, the extent of the adjustment of the control member of either of said first and second potentiometers constituting the measurement of said physical quantity and said physical quantity having said predetermined magnitude at a substantially zero value of said second residual voltage.

5. A circuit arrangement for measuring and regulating a physical quantity comprising means for deriving a first voltage dependent upon the magnitude of said physical quantity, means for producing a second voltage, means for varying the amplitude of said second voltage comprising a first potentiometer having a control member, means for producing a third voltage, means for varying the amplitude of said third voltage comprising a second potentiometer having a control member, means for producing a fourth voltage dependent upon a predetermined magnitude of said physical quantity, means for combining the said variable second voltage with said first voltage thereby to produce a first residual voltage, means for combining the said variable third voltage with said fourth voltage thereby to produce a second residual voltage, means for varying the magnitude of said physical quantity, an amplifier having an input circuit and an output circuit, switching means for selectively applying said first and second residual voltages to the said input circuit of said amplifier, an electrically energized adjusting member connected in the said output circuit of said amplifier, and means for selectively coupling said adjusting member to the said control members of said first and second potentiometers and to said magnitude varying means whereby said first residual voltage is applied to said adjusting member to displace the control member of said first potentiometer to a position at which said first residual voltage is substantially zero in one selective condition and said second residual voltage is applied to said adjusting member to vary said magnitude varying means in another selective condition, the extent of the adjustment of the control member of either of said first and second potentiometers constituting the measurement of said physical quantity and said physical quantity having said predetermined magnitude at a substantially zero value of said second residual voltage.

6. A circuit arrangement for measuring and regulating a physical quantity comprising means for deriving a first voltage dependent upon the magnitude of said physical quantity, means for producing a second voltage, means for varying the amplitude of said second voltage comprising a first potentiometer having a control member, means for producing a third voltage, means for varying the amplitude of said third voltage comprising a second potentiometer having a control member, means for producing a fourth voltage dependent upon a predetermined magnitude of said physical quantity, means for producing a fifth voltage, means for varying the amplitude of said fifth voltage comprising a third potentiometer having a control member connected to said fourth voltage producing means, means for producing a sixth voltage, means for varying the amplitude of said sixth voltage comprising a fourth potentiometer connected in parallel with said third potentiometer and having a control member, means for combining the said variable second voltage with said first voltage thereby to produce a first residual voltage, means for combining the said variable third voltage with said fourth voltage thereby to produce a second residual voltage, means for combining said second residual voltage with the said variable fifth voltage and the said variable sixth voltage thereby to produce a third residual voltage, electrically energized regulating means for varying the magnitude of said physical quantity coupled to the control member of said fourth potentiometer, means for applying said third residual voltage to said regulating means to vary the magnitude of said physical quantity and to displace the control member of said fourth potentiometer to a position at which said third residual voltage is substantially zero, a first electrically energized adjusting member coupled to the said control members of said first and second potentiometers, a second electrically energized adjusting member coupled to the said control member of said third potentiometer, and switching means for applying said first residual voltage to said first adjusting member in one operative condition to displace the said control member of said first potentiometer to a position at which said first residual voltage is substantially zero and for applying said second residual voltage to said second adjusting member in another operative condition to displace the said control member of said third potentiometer, the extent of the adjustment of the control member of either of said first and second potentiometers constituting the measurement of said physical quantity and said physical quantity having said predetermined magnitude at a substantially zero value of said third residual voltage.

References Cited in the file of this patent

UNITED STATES PATENTS 2,639,411   Shafer _____ May 19, 1953